(12) United States Patent
Aßmann

(10) Patent No.: US 12,135,374 B2
(45) Date of Patent: Nov. 5, 2024

(54) DIFFERENTIAL CORRELATOR FILTER FOR EFFICIENT TOF PEAK FINDING

(71) Applicant: STMicroelectronics (Research & Development) Limited, Marlow (GB)

(72) Inventor: Andreas Aßmann, Edinburgh (GB)

(73) Assignee: STMICROELECTRONICS (RESEARCH & DEVELOPMENT) LIMITED, Buckinghamshire (GB)

(*) Notice: Subject to any disclaimer, the term of this patent is extended or adjusted under 35 U.S.C. 154(b) by 217 days.

(21) Appl. No.: 17/858,421

(22) Filed: Jul. 6, 2022

(65) Prior Publication Data

US 2024/0012149 A1   Jan. 11, 2024

(51) Int. Cl.
*G01S 17/894* (2020.01)
*G01S 7/481* (2006.01)
*G01S 7/4865* (2020.01)
*H04N 23/56* (2023.01)

(52) U.S. Cl.
CPC .......... *G01S 17/894* (2020.01); *G01S 7/4816* (2013.01); *G01S 7/4865* (2013.01); *H04N 23/56* (2023.01)

(58) Field of Classification Search
CPC .... G01S 17/894; G01S 7/4816; G01S 7/4865; H04N 23/56
See application file for complete search history.

(56) References Cited

U.S. PATENT DOCUMENTS

| 2018/0253404 | A1* | 9/2018 | Moore | G06F 11/0703 |
| 2019/0056497 | A1* | 2/2019 | Pacala | G01S 7/4816 |
| 2021/0382964 | A1 | 12/2021 | Moore et al. | |

* cited by examiner

*Primary Examiner* — Girumsew Wendmagegn
(74) *Attorney, Agent, or Firm* — Slater Matsil, LLP

(57) ABSTRACT

A differential correlator filter includes: a pre-pulse region, where first filter coefficients in the pre-pulse region have negative values; and a pulse region including: a rising edge region adjacent to the pre-pulse region, where second filter coefficients in the rising edge region have positive values; an accumulation region adjacent to the rising edge region, where third filter coefficients of the accumulation region have positive values; and a falling edge region adjacent to the accumulation region, where fourth filter coefficients of the falling edge region have positive values, where the accumulation region is between the rising edge region and the falling edge region. The differential correlator filter further includes a post-pulse region adjacent to the pulse region, where the pulse region is between the pre-pulse region and the post-pulse region, where fifth filter coefficients of the post-pulse region have negative values.

20 Claims, 14 Drawing Sheets

DIFFERENTIAL CORRELATOR FILTER FOR EFFICIENT TOF PEAK FINDING

TECHNICAL FIELD

The present invention relates generally to time-of-flight (ToF) imagers, and, in particular embodiments, to differential correlator filters used in ToF imagers for processing the histograms of the ToF imagers.

BACKGROUND

Time-of-flight (ToF) imagers (also referred to as ToF sensors) have been widely used recently for various applications, such as gesture/facial recognition, light detection and ranging (LiDAR), virtual reality, augmented reality, and autonomous robotics. To measure an object, the ToF sensor sends a light signal towards the object and measures the time taken by the signal to travel to the object and back.

Single photon avalanche diode (SPAD) may be used as a detector of reflected light. In general, an array of SPADs is provided as a sensor (e.g., an SPAD array) in order to detect a reflected light pulse. A reflected photon may generate a carrier in the SPAD through the photo electric effect. The photo-generated carrier may trigger an avalanche current in one or more of the SPADs in an SPAD array. The avalanche current may signal an event, namely that a photon has been detected. Information related to the reflected intensity, also referred to as "signal count," is output as histograms of the SPAD array. The histogram for each SPAD includes a plurality of histogram bins, where each histogram bin corresponds to a distance (or a narrow range of distance) from the SPAD array, and the value (e.g., signal count) of each histogram bin corresponds to the number of detected avalanche current events (e.g., number of detected photons).

The histogram from the SPAD need to be processed to extract useful information, such as the number of targets detected, the distance of the targets, and so on. These processing is usually computational intensive and is often performed by an off-chip processor that is located in a different semiconductor die from the semiconductor die having the SPAD array. Efficient processing for the histogram of the SPAD is needed to reduce computational complexity and to enable higher-level of integration for ToF imagers.

SUMMARY

In some embodiments, a differential correlator filter includes: a pre-pulse region, wherein first filter coefficients in the pre-pulse region have negative values; and a pulse region comprising: a rising edge region adjacent to the pre-pulse region, wherein second filter coefficients in the rising edge region have positive values; an accumulation region adjacent to the rising edge region, wherein third filter coefficients of the accumulation region have positive values; and a falling edge region adjacent to the accumulation region, wherein fourth filter coefficients of the falling edge region have positive values, wherein the accumulation region is between the rising edge region and the falling edge region. The differential correlator filter further includes a post-pulse region adjacent to the pulse region, wherein the pulse region is between the pre-pulse region and the post-pulse region, wherein fifth filter coefficients of the post-pulse region have negative values.

In some embodiments, an integrated circuit (IC) device includes: a light source configured to generate a light signal; a single-photon avalanche diode (SPAD) array comprising a plurality of SPADs, wherein the SPAD array is configured to generate a histogram for each of the plurality of SPADs in the SPAD array; and a differential correlator filter configured to process the histogram for at least one of the plurality of SPADs. The different correlator filter includes: a pre-pulse region, wherein first filter coefficients in the pre-pulse region have negative values; and a pulse region comprising: a rising edge region, wherein second filter coefficients in the rising edge region have positive values; an accumulation region, wherein third filter coefficients of the accumulation region have positive values; and a falling edge region, wherein fourth filter coefficients of the falling edge region have positive values, wherein the accumulation region is between the rising edge region and the falling edge region, wherein a width of the pulse region corresponds to a full width at half maximum (FWHM) of a pulse shape of the light source. The different correlator filter further includes a post-pulse region, wherein the pulse region is between the pre-pulse region and the post-pulse region, wherein fifth filter coefficients of the post-pulse region have negative values.

In some embodiments, a time-of-flight (ToF) imager includes: a light source configured to generate a light signal for illuminating an object; a single-photon avalanche diode (SPAD) configured to generate a histogram for reflected light signal from the object; and a differential correlator filter configured to process the histogram, the different correlator filter comprising: a pre-pulse region, wherein first filter coefficients in the pre-pulse region have negative values; and a pulse region comprising: a rising edge region, wherein second filter coefficients in the rising edge region have increasing positive values; an accumulation region, wherein third filter coefficients of the accumulation region have increasing positive values or a constant positive value; and a falling edge region, wherein fourth filter coefficients of the falling edge region have decreasing positive values, wherein the accumulation region is between the rising edge region and the falling edge region, wherein a width of the pulse region corresponds to a full width at half maximum (FWHM) of a pulse shape of the light source. The different correlator filter further comprises a post-pulse region, wherein the pulse region is between the pre-pulse region and the post-pulse region, wherein fifth filter coefficients of the post-pulse region have negative values.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be re-described in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described in the context of ToF imagers (also referred to as ToF sensors), and in particular embodiments, differential correlator filters for efficient processing of the histograms of the ToF imagers.

Figure 1:
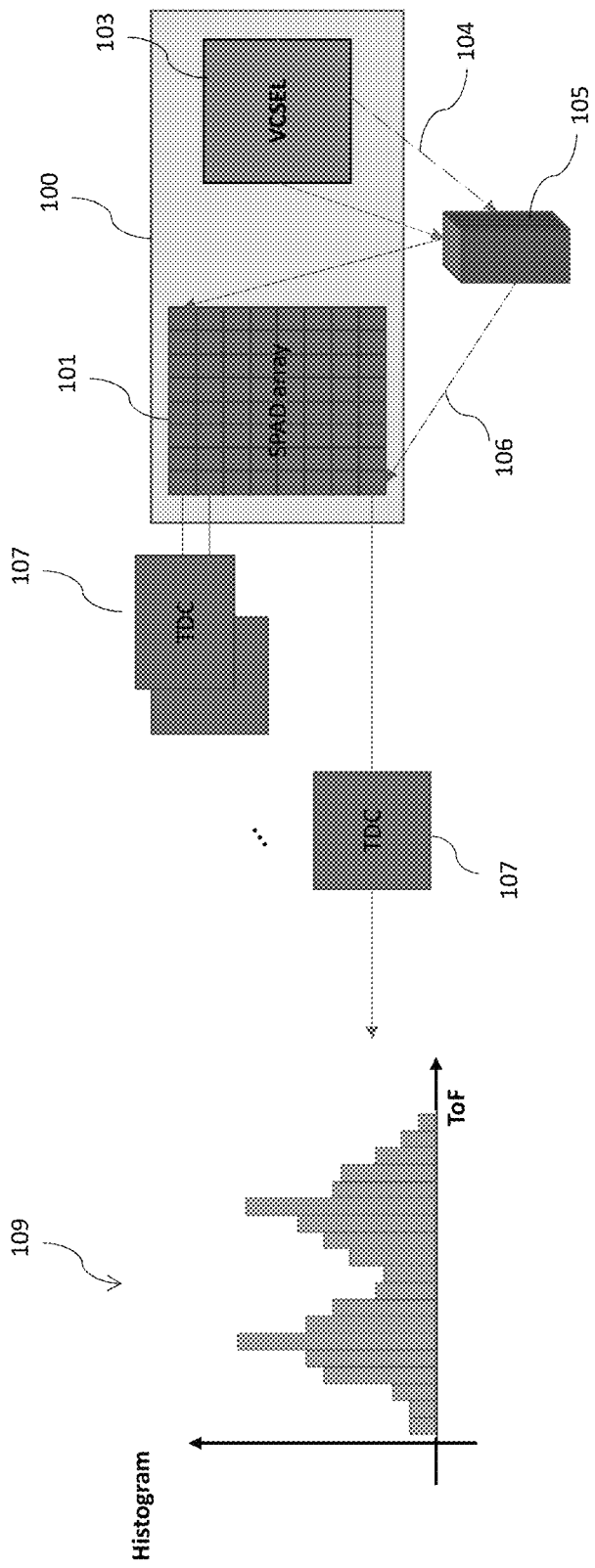
FIG. 1 illustrates a time-of-flight (ToF) imager, in an embodiment; [Don]

FIG. 1 illustrates a time-of-flight (ToF) imager 100, in an embodiment. The ToF imagers 100 includes a SPAD array 101 and a light source 103. The light source 103 is a circuit configured to generate a light signal 104 for illuminating an object 105 (e.g., a target). The light source 103 may be, e.g., a vertical-cavity surface-emitting laser (VCSEL) device, a light-emitting diode (LED), an infra-red (IR) device, or the like. The reflected light signal 106 from the object 105 is received by the SPAD array 101. The SPAD array 101 includes a plurality of SPADs arranged in, e.g., rows and columns. Each of the SPADs in the SPAD array 101 has a respective time-to-digital converter (TDC) 107, which generates a histogram 109 for the received light signal at each of the SPADs. Note that to avoid cluttering in FIG. 1, the TDCs 107 are illustrates as being outside the ToF imager 100, with the understanding that the TDCs 107 are part of the ToF imager 100.

The histogram from the TDC 107 is processed to extract useful information about the object 105, such as the number of targets, and the distance of the target(s) from the SPAD array. The information extracted from the histograms of the SPADs in the SPAD array may be used to construct, e.g., a 3D depth map. Conventional algorithms for processing the histogram is computationally intensive, and may use multiple iterative algorithm stages and/or multiple software instances to cover corner cases and applications. Due to the high computational complexity, the histograms from the SPAD array is often processed by an off-chip processing module, e.g., a micro-processor or an application-specific integrated circuit (ASIC), that is located in a different integrated circuit (IC) device from the IC device (e.g., the ToF imager) where the SPAD array is located. Such off-chip computation is not only costly (due to the number of IC devices needed), but also increases input/output (I/O) complexity of the ToF imager, requires large amounts of memory, and incurs time delay for data transfer, due to the large amount of histogram data to be transferred between the ToF imager and the off-chip processing module.

Even if the micro-processor or ASIC for histogram processing is integrated with the SPAD array in the same IC device (e.g., on the same semiconductor die of the ToF imager), the high computational complexity of the conventional histogram processing means high complexity, high power, and large memory requirement for the integrated IC device. For example, many iterations (e.g., for-loops) may be performed by the conventional histogram processing to loop over the number of different histograms, multiple iterative algorithm stages may be needed, and multiple software instances may be used to cover corner cases and applications, which introduce processing latency, limit frame time, and are difficult to maintain.

The present disclosure discloses a differential correlator filter (DCF) for efficiently processing the histogram of each of the SPADs in the SPAD array. The differential correlator filter may be implemented in hardware as, e.g., a finite-impulse response (FIR) filter to filter the histogram, or as a circular summing multiplication to implement the convolution operation between the histogram and the differential correlator filter. For ease of discussion, filtering the histogram of each SPAD using the differential correlator filter may also be referred to as performing a convolution of the histogram and the differential correlator filter. As will be discussed in details hereinafter, the output of the differential correlator filter produces zero-crossing points to indicate the start point and the stop point of the return signal corresponding to a target. A simple calculation of median phase produces an accurate estimate of the target distance. The simplicity of the disclosed differential correlator filter allows for easy integration of histogram processing circuit into the ToF imager and significantly reduced device complexity.

Figure 2:
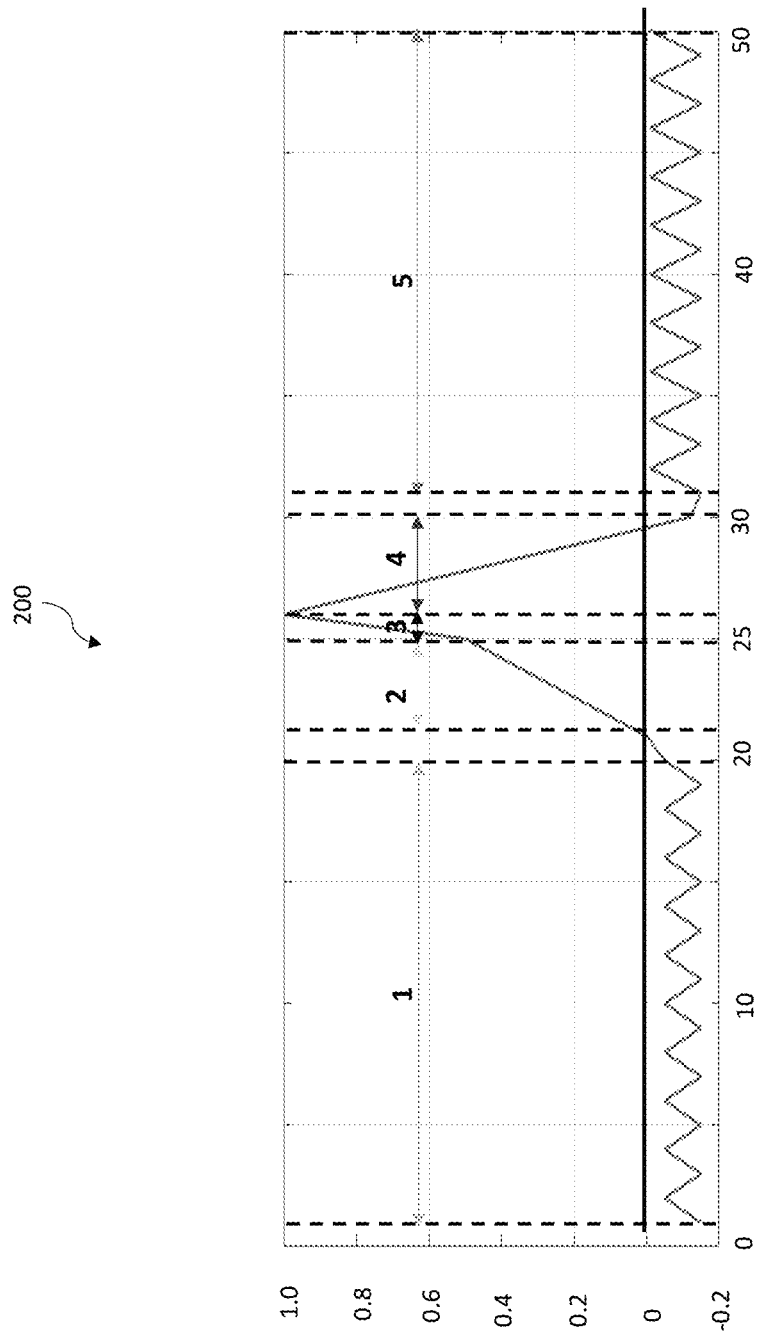
FIG. 2 illustrates a differential correlator filter (DCF), in an embodiment.

FIG. 2 illustrates a differential correlator filter 200, in an embodiment. The differential correlator filter 200 may be used to filter the histogram of each of the SPADs in the SPAD array 101. As illustrated in FIG. 2, the differential correlator filter 200 is a finite-impulse response (FIR) filter with a plurality of coefficients. As skilled artisans readily appreciate, the plot in FIG. 2 is formed by connecting adjacent coefficients of the differential correlator filter 200 with a line segment.

As illustrated in FIG. 2, the differential correlator filter 200 has five regions, labeled as Regions 1, 2, 3, 4, and 5 in FIG. 2, respectively. The coefficients in Region 1 have negative values. Similarly, the coefficients in Region 5 also have negative values. The coefficients in Regions 2, 3, and 4 have positive values and form a positive pulse shape. In the discussion herein, Region 1 is also referred to as the pre-pulse region, Region 5 is also referred to as the post-pulse region, and Regions 3, 4, and 5 are collectively referred to as the pulse-region.

In some embodiments, the magnitude (e.g., the absolute value) of the sum of the negative coefficients in Regions 1 and 5 is equal to or larger than the sum of the positive coefficients in Regions 2, 3, and 4. Let $P_1$, $P_2$, $P_3$, $P_4$, and $P_5$ denote the sum of the coefficients in Regions 1, 2, 3, 4, and 5, respectively, then:

$$|P_1+P_5| \geq P_2+P_3+P_4 \qquad (1)$$

In other words, the sum of all the coefficients of the differential correlator filter 200 is equal to or smaller than zero. For example, the difference between the value $|P_1+P_5|$ and the value of $P_2+P_3+P_4$ may be chosen to be within, e.g., less than about 10%, such as 5%, of the value of $P_2+P_3+P_4$. In the illustrated embodiment, the higher is the value $|P_1+P_5|$, the higher is the likelihood for zero-crossing to occur at the output of the correlator filter 200 at the expense of peak detection sensitivity (e.g., the sensitivity of the ability to detect positive pulse peaks at the output of the correlator filter 200). Therefore, the values $|P_1+P_5|$ and $P_2+P_3+P_4$ may be adjusted for performance trade-offs and to achieve different performance criteria. For example, in some embodiments, $|P_1+P_5|=P_2+P_3+P_4$, such that the sum of all of the coefficients of the differential correlator filter 200 is zero, in order to achieve high peak detection sensitivity. In some embodiments, the coefficients of the differential correlator filter 200 are adjusted such that the sum of all of the coefficients of the differential correlator filter 200 has a negative value, in order to increase zero-crossing detections. In some embodiments, the sum of the coefficients in Region 5 is smaller than the sum of the coefficients in Region 1 (e.g., $P_5<P_1$). Since $P_5$ and $P_1$ are both negative numbers, $P_5<P_1$ may also be expressed as $|P_1|=r\times|P_5|$, where r is a number between zero and one. More details are discussed hereinafter.

In some embodiments, the width of Regions 2, 3, and 4 (measured in terms of seconds) is chosen to match (e.g., be the same as) the Full Width at Half Maximum (FWHM) of the pulse shape of the light source 103 of the ToF imager 100. For example, if the number of coefficients in Regions 2, 3, and 4 is N, and the bin width (e.g., width of the histogram bin measured in time) of the histogram is T, and the FWHM of the pulse shape of the light source 103 (e.g., a VCSEL) is denoted as $W_{FWHM}$, then:

$$N \times T = W_{FWHM} \qquad (2)$$

The FWHM of the pulse shape of the light source 103 may be determined by a characterization process of the light source 103, where measurements of the pulse shape of the light source 103 are performed in, e.g., a calibration process. Characterization of the light source 103 is known, and therefore, details are not discussed here.

As will discussed in more details hereinafter, the coefficients in Regions 2, 3, and 4 are chosen such that the pulse shape formed by the coefficients in Regions 2, 3, and 4 is similar to, or match, the pulse shape of the light source 103. In the example of FIG. 2, each of the Regions 2, 3, and 4 is a liner region, with the coefficients in each region increases or decreases linearly. The choice of linear region in FIG. 2 is simply a non-limiting example. For example, the coefficients in Regions 2, 3, and 4 may form more complicated shapes that more closely resemble the pulse shape of the light source 103.

The number of coefficients in Region 1 and the number of coefficients in Region 5 may be chosen as any suitable number in accordance with performance criteria and/or performance trade-offs. For example, shortening (e.g., reducing the number of coefficients in) the Regions 1 and 5 may allow detection of closely-spaced targets, and lengthening (e.g., increasing the number of coefficients in) the Regions 1 and 5 may achieve better noise suppression with reduced possibility of detecting closely-spaced targets.

Figure 3:
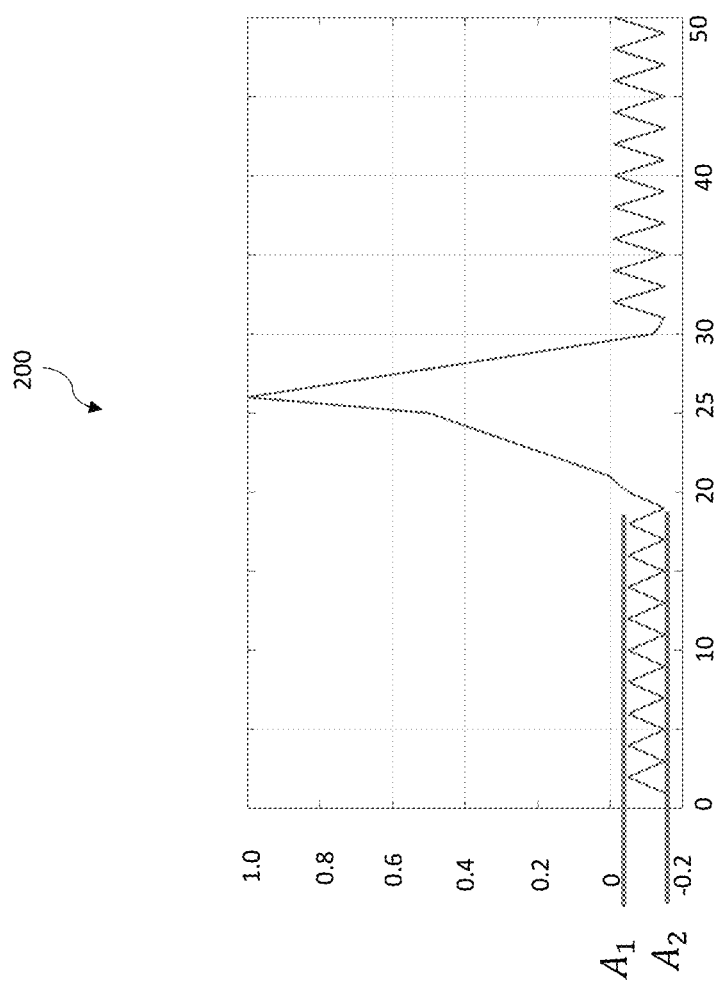
FIGS. 3-8 illustrate various regions of the differential correlator filter of FIG. 2, in an embodiment.

FIGS. 3-8 illustrate details of various regions of the differential correlator filter 200 of FIG. 2, in an embodiment. FIG. 3 shows that the coefficients in Region 1 (e.g., pre-pulse region) have values that alternate (or oscillate) between a negative value $A_2$ and a negative value $A_1$, such that the coefficients in Region 1 form a zig-zap pattern, a saw-tooth pattern, or a differential pattern. For example, the first coefficient in Region 1 is assigned the negative value $A_2$, the second coefficient in Region 1 in assigned the negative value $A_1$, the third coefficient in Region 1 is assigned the negative value $A_2$, and so on. Stated another way, denoted the i-th coefficient of the differential correlator filter 200 as DCF(i), with i being the index of the coefficient, then coefficients in Region 1 with odd indices may be assigned the negative value $A_2$, and coefficients in Region 1 with even indices may be assigned the negative value $A_1$. Note that in the discussion herein, the indices for the coefficients of the differential correlator filter 200 increase sequentially from the first (e.g., the leftmost) coefficient of the differential correlator filter 200 toward the last (e.g., the rightmost) coefficient of the differential correlator filter 200, with the first index being 1.

The zig-zag pattern of coefficients in the pre-pulse region is used to improve performance in low photon count scenarios, where the photon count may have a Poisson distribution with large variance. The negative values $A_1$ and $A_2$ are set in accordance with the coefficient values in Regions 2, 3, 4, and 5 (e.g., to satisfy Equation (1)). In some embodiments, the difference $\Delta A=|A_1-A_2|$ is chosen to set the sensitivity to small changes in the histogram. For example, the smaller is the difference $\Delta A$, the more sensitive is the filter output to smaller changes in the histogram.

Figure 4:
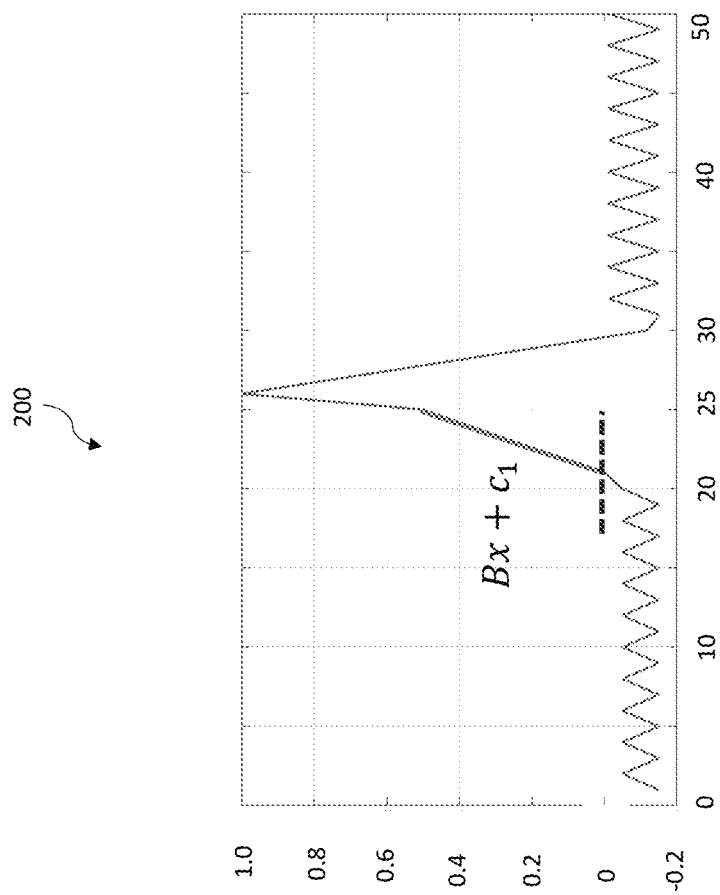

FIG. 4 shows the coefficients in Region 2 (also referred to as the rising edge region). As illustrated in FIG. 4, coefficients in Region 2 form a linear rising edge with a positive gradient B. In particular, let $P1_{end}$ denote the index of the last (e.g., rightmost) coefficient in Region 1, and let $P1_{end}+1$ and $P2_{end}$ denote the indices of the first (e.g., the leftmost) coefficient and the last (e.g., the rightmost) coefficient in Region 2, respectively, and let $C_1$ denote the first coefficient in Region 2, then for any index i within Region 2 (e.g., $P1_{end}+1 \leq i \leq P2_{end}$), the coefficient DCF(i) is given as DCF(i)=$B(i-P1_{end}-1)+C_1$. In some embodiments, the rising edge in Region 2 is used to amplify the rising edge in the histogram.

Figure 5:
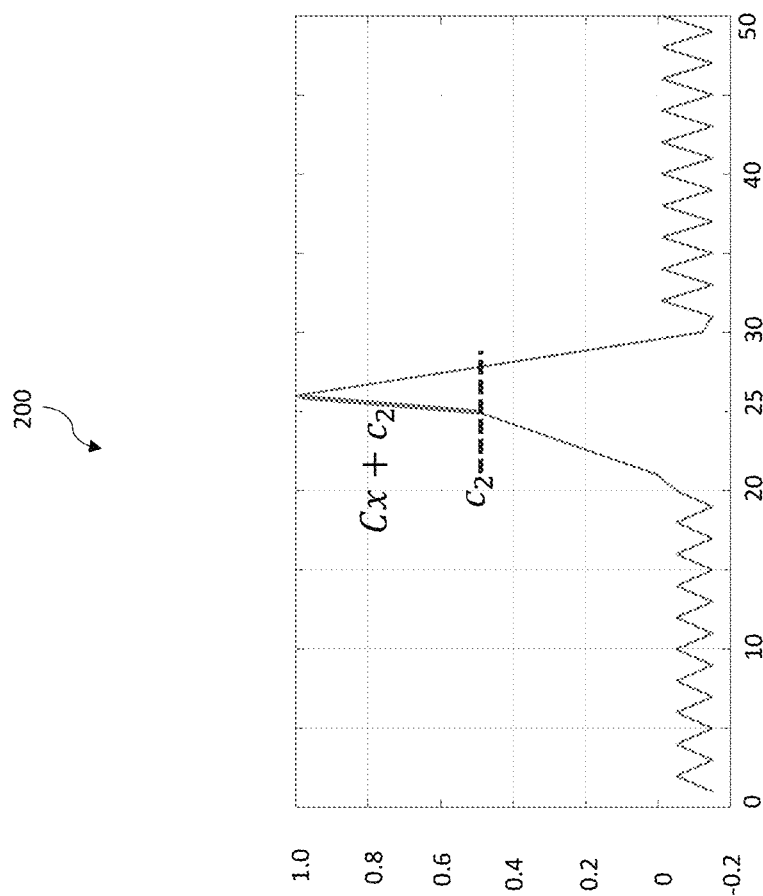

FIG. 5 shows the coefficients in Region 3 (also referred to as the accumulation region). As illustrated in FIG. 5, coefficients in Region 3 form another linear rising edge with a positive gradient C. In particular, let $P2_{end}$ denote the index of the last coefficient in Region 2, and let $P3_{end}$ denote the index of the last coefficient in Region 3, and let $C_2$ denote the last coefficient in Region 2, then for any index i within Region 3 (e.g., $P2_{end} \leq i \leq P3_{end}$), the coefficient DCF(i) is given as DCF(i)=$C(i-P2_{end})+C_2$. Although the illustrated embodiment shows that the accumulation region has a positive gradient C, which is larger than the positive gradient B of the rising edge region, this is merely a non-limiting example. In some embodiments, the accumulation region has a zero gradient (e.g., a flat region). In some embodiments, the non-negative gradient C (e.g., $C \geq 0$) of the accumulation region is used to accumulate the peak region of the histogram.

Figure 6:
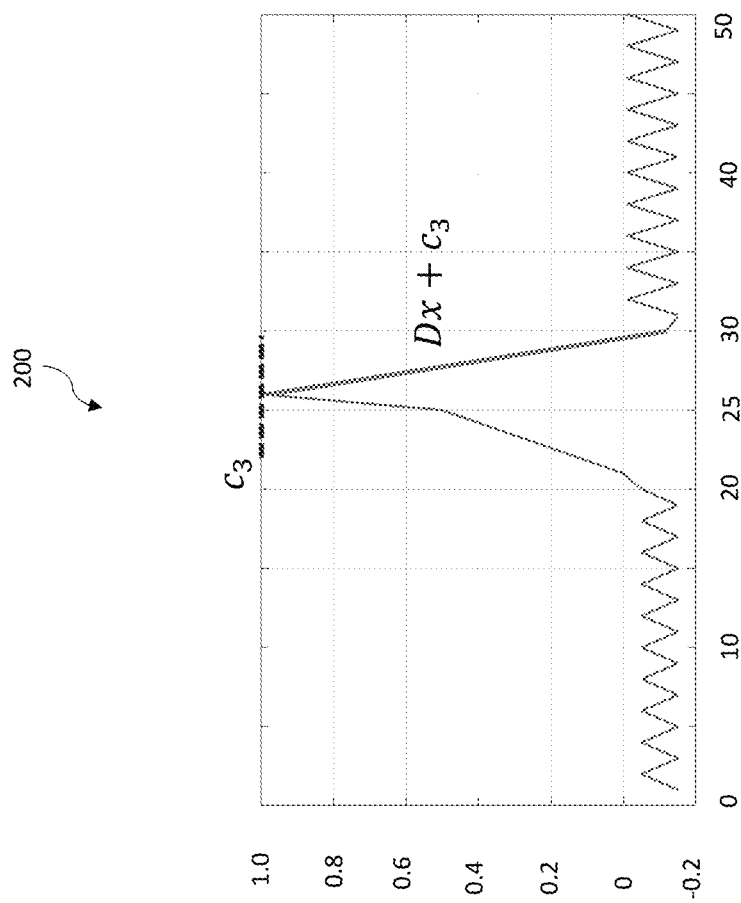

FIG. 6 shows the coefficients in Region 4 (also referred to as the falling edge region). As illustrated in FIG. 6, coefficients in Region 4 form a linear falling edge with a negative gradient D. In particular, let $P3_{end}$ denote the index of the last coefficient in Region 3, and let $P4_{end}$ denote the index of the last coefficient in Region 4, and let $C_3$ denote the last coefficient in Region 3, then for any index i within Region 4 (e.g., $P3_{end} \leq i \leq P4_{end}$), the coefficient DCF(i) is given as DCF(i)=$D(i-P3_{end})+C_3$. In some embodiments, the falling edge region is used to amplify the falling edge of the histogram.

Figure 7:
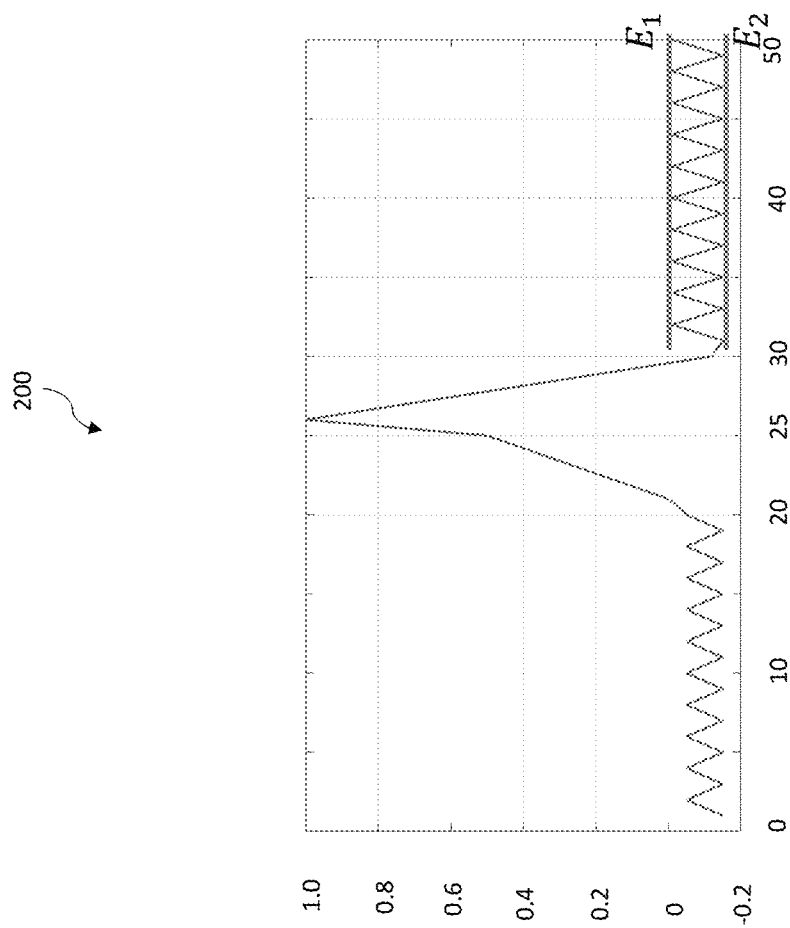

FIG. 7 shows that the coefficients in Region 5 (e.g., post-pulse region) have values that alternate (or oscillate) between a negative value $E_2$ and a negative value $E_1$, such that the coefficients in Region 5 form a zig-zap pattern, a saw-tooth pattern, or a differential pattern. For example, coefficients in Region 5 with odd indices may be assigned the negative value $E_2$, and coefficients in Region 5 with even indices may be assigned the negative value $E_1$. The zig-zag pattern of coefficients in the post-pulse region is used to improve performance in low photon count scenarios, similar to the pre-pulse region. In addition, by choosing the mean of the $E_1$ and $E_2$ to be smaller than the mean of $A_1$ and $A_2$ (e.g., $(E_1+E_2)/2<(A_1+A_2)/2$), the differential correlator filter 200 amplifies changes in the histogram to trigger zero-crossing. The negative values $E_1$ and $E_2$ are set in accordance with the coefficient values in Regions 1, 2, 3, and 4 (e.g., to satisfy Equation (1)). In some embodiments, the difference $\Delta E=|E_1-E_2|$ is chosen to set the sensitivity to small changes in the histogram. For example, the smaller is the difference $\Delta E$, the more sensitive is the filter output to smaller changes in the histogram.

Figure 8:
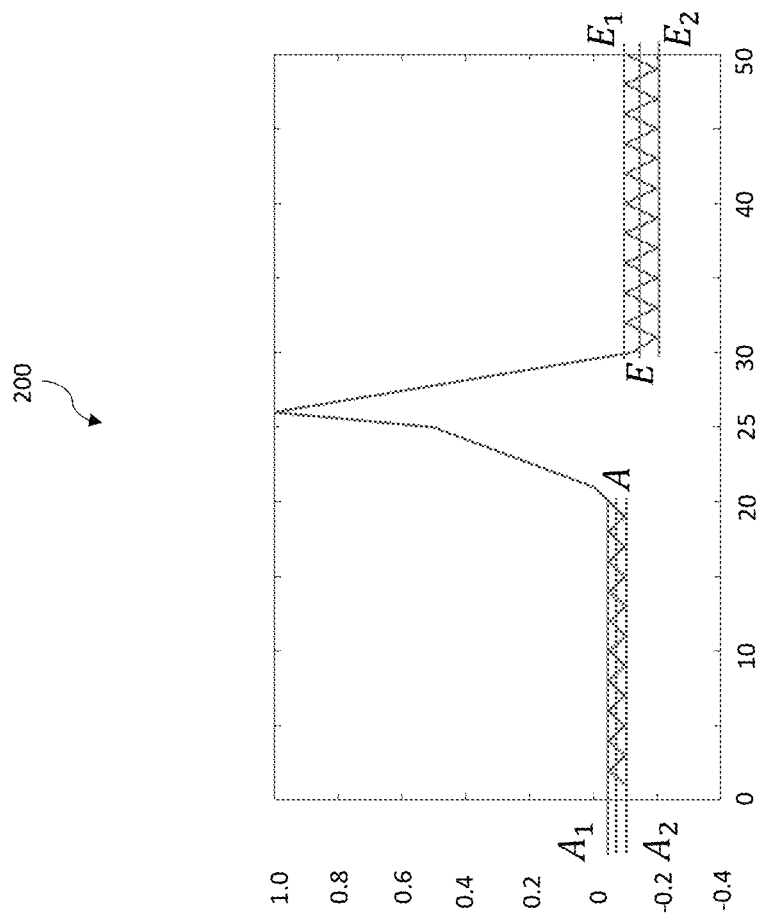

FIG. 8 illustrates adjustments of the pre-pulse region and the post-pulse region to achieve certain performance targets. In the example of FIG. 8, let A denote the average of the negative values $A_1$ and $A_2$ (e.g., $A=(A_1+A_2)/2$, $A<0$), and let E denote the average of the negative values $E_1$ and $E_2$ (e.g., $E=(E_1+E_2)/2$, $E<0$), by choosing E to be smaller than A, the likelihood of a zero-crossing in the filter response, when a falling edge of a pulse in the histogram is present, may be increased. Note that by choosing E to be smaller than A, the overall filter response is likely to be negatively biased (e.g., due to the sum of all coefficients being negative), which may cause the idle response of the differential correlator filter 200 to be below zero.

The zig-zap pattern of the coefficients in the pre-pulse region and the post-pulse region may be well-suited for histograms with low photon counts, where statistics of the photon counts follow Poisson distribution. If the histogram is expected to have large photon counts and statistics of the photon count are approximately Gaussian, the shape of the differential correlator filter 200 may be simplified, e.g., by substituting the zig-zag patterns in the pre-pulse region and the post-pulse region with their respective mean value of A and E, respectively. In other words, the coefficients in the pre-pulse region may have a fixed value of A, and the coefficients in the post-pulse region may have a fixed value of E.

Figure 9B:
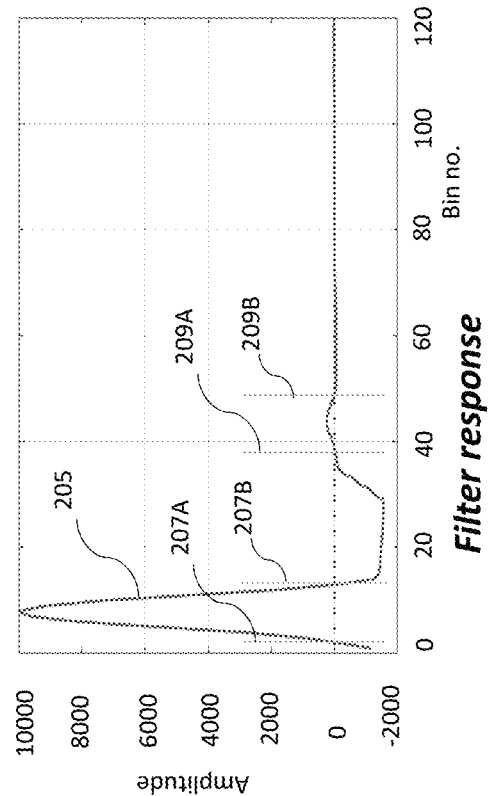
FIG. 9B illustrates an output of the differential correlator filter, in an embodiment.
Figure 9A:
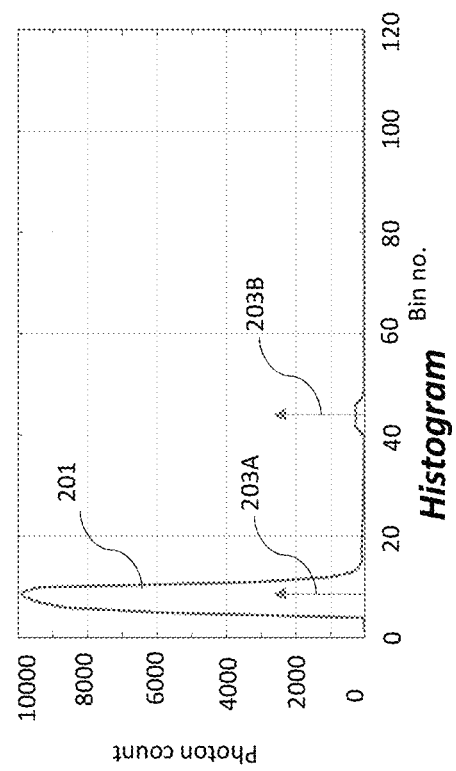
FIG. 9A illustrates a histogram of a ToF imager, in an embodiment.

FIG. 9A illustrates a histogram 201 of a ToF imager, in an embodiment. Note that for simplicity, the histogram 201 shows the envelop of the histogram bins without illustrating individual histogram bins. FIG. 9A further illustrates two pulses 203A and 203B, which indicates the location of two targets. As a result of reflection from the targets, the photon count (e.g., signal count) of the histogram shows two corresponding pulses.

FIG. 9B illustrates an output signal 205 of the differential correlator filter 200, in an embodiment. The histogram 201 of FIG. 9A is processed by the differential correlator filter 200 (e.g., filtered by the differential correlator filter 200, or convolved with the differential correlator filter 200 through a convolution operation) to produce the output signal 205 of FIG. 9B. As illustrated in FIG. 9B, the output signal 205 shows two pulse regions corresponding to the two target locations (see 203A and 203B in FIG. 9A). In particular, the first pulse region of the output signal 205 is defined between zero-crossing points 207A and 207B, and the second pulse region of the output signal 205 is defined between zero-crossing points 209A and 209B. Note that the zero-crossing point 207A (or 209A) is a zero-crossing from negative to positive, which indicates the start of a pulse region; and the zero-crossing point 207B (or 209B) is a zero-crossing from positive to negative, which indicates the end of a pulse region. In other words, each pair of the zero-crossing points (e.g., 207A and 208B, or 209A and 209B) indicate the start point and stop point of a respective pulse region in the output signal 205.

A zero-crossing algorithm for finding the zero-crossing points (e.g., start points and stop points of pulse regions) in the output of the differential correlator filter 200 is described herein. The algorithm monitors the output of the differential correlator filter 200 for a change from negative to positive, and marks the position of the change as a potential start point. The algorithm then monitors the output of the differential correlator filter 200 for a change from positive to negative, and marks the position of the change as a potential stop point. The corresponding histogram data (or the corresponding output of the differential correlator filter 200) between the potential start point and the potential stop point are summed together and used as a confidence measurement. If the confidence measurement is above a threshold value (e.g., a user defined threshold), the potential start point and the potential stop point are considered valid and stored as a pair of start point and stop point. Denote the output of the differential correlator filter 200, or filter response, as FR, and denote the histogram as h, the above processing may be described by the following pseudo code:

```
for i=2: length(FR)
    if FR(i−1)<0 and FR(i)>0
        start(n)=i;
    end
    if FR(i−1)>0 and FR(i)<0
        confidence(n)=Σ h(start(n): i);
    end
    if confidence(n) > threshold
        stop(n)=i;
        n=n+1;
    end
end
```

Once the start points and stop points are found, a "center-of-mass" calculation can be performed to calculate a median phase for each pulse region, which indicates the location of the target in that pulse region. In particular, for each pair of start point and stop point (which defines one pulse region in the filter response that corresponds to a respective target), the center-of-mass calculation calculates a median phase, which corresponds to a weighted histogram bin location for the target. The operation may be described by the following pseudo code:

for n=1: length(stop)
$$\text{median\_phase}(n) = \frac{\sum_{i=start(n)}^{stop(n)} h(i) \times i}{\sum_{i=start(n)}^{stop(n)} i}$$
end The zero-crossing algorithm and the center-of-mass algorithm discussed above are simply non-limiting examples. Other suitable algorithms are also possible and are fully intended to be included within the scope of the present disclosure.

Figure 10:
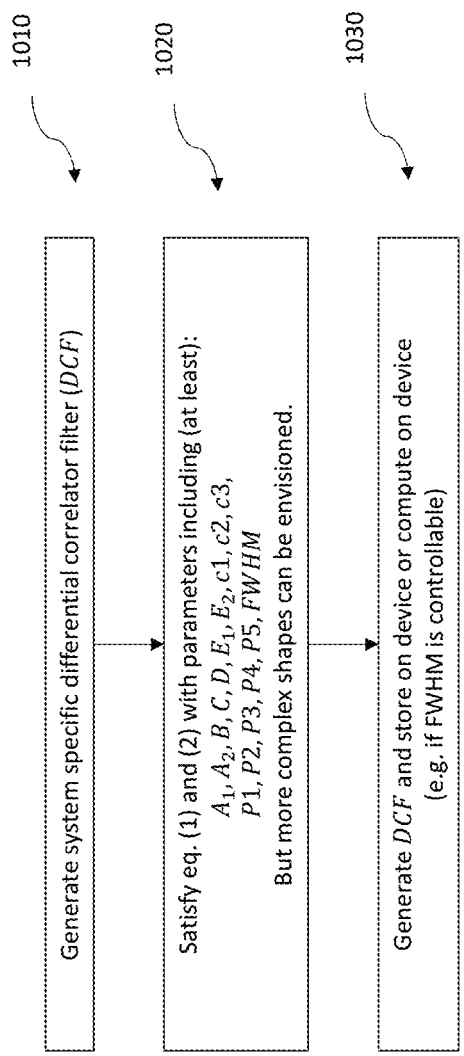
FIG. 10 illustrates a flow chart for generating a differential correlator filter, in an embodiment.

FIG. 10 illustrates a flow chart for generating a differential correlator filter, in an embodiment. In block low, a differential correlator filter, same as or similar to the example illustrated in FIG. 2, is generated in accordance with system specification. For example, depending on system level considerations such as the expected signal count, noise level, type of targets, number of targets, the width of the pulse shape of the light source, and so on, certain design aspects of the differential correlator filter, such as the width of the pulse region of the filter, the number of coefficients in the pre-pulse region and the post-pulse region, and the shape (e.g., zig-zap vs. constant value) of the pre-pulse region and the post-pulse region, may be determined. Next, in block 1020, various parameter for the differential correlator filter are adjusted to, e.g., satisfy Equations (1) and (2) above, and to tune the sensitivity of the filter to changes in the histogram. Next, in block 1030, the coefficients of the differential correlator filter are stored for use in the hardware implementation of the filter, or for use in computation in a software implementation of the filter.

Figure 11:
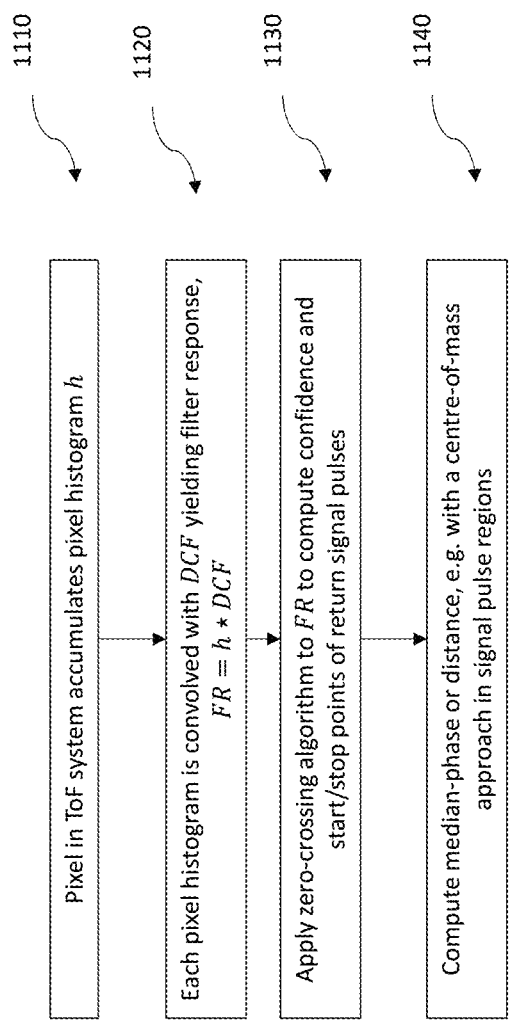
FIG. 11 illustrates a flow chart for processing the histogram of a ToF imager using a differential correlator filter, in an embodiment.

FIG. 11 illustrates a flow chart for processing the histogram of a ToF imager using a differential correlator filter, in an embodiment. The differential correlator filter may be the same as or similar to the example of FIG. 2, and may be designed according to the flow chart of FIG. 10. As illustrated in FIG. 11, in block 1110, each pixel (e.g., a SPAD) in the ToF imager accumulate photon count to generate a histogram h. In block 1120, the histogram h from each pixel is convolved with the differential correlator filter to generate the filter response FR. In block 1130, the zero-crossing algorithm described above is used to compute the confidence measurement and find the start/stop points in the histogram. In block 1140, a median-phase for each pulse region defined by a pair of start/stop points is calculated, using the calculation described above.

To appreciate the performance advantage of the disclosed differential correlator filter, comparison with some reference filters are discussed hereinafter with reference to FIGS. 12A and 12B.

Figure 12B:
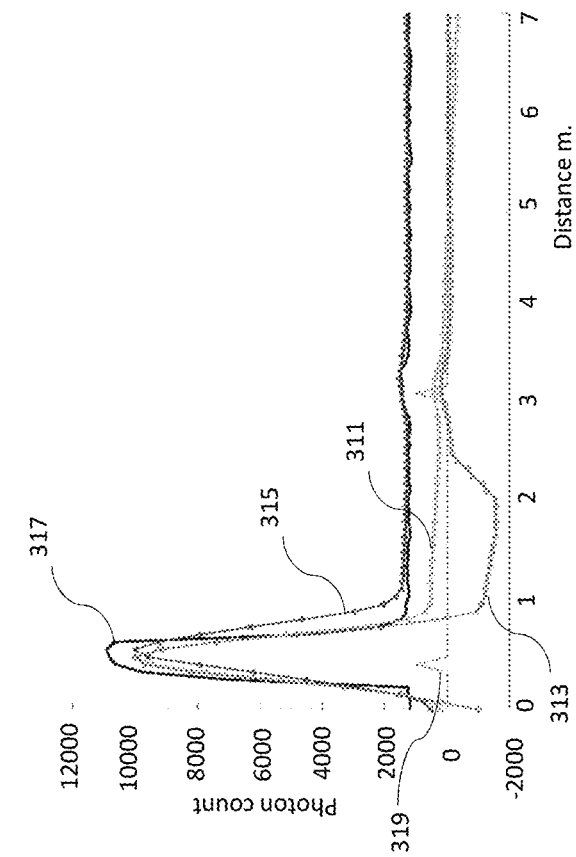
FIG. 12B illustrates the outputs of the different filters of FIG. 12A, in an embodiment.
Figure 12A:
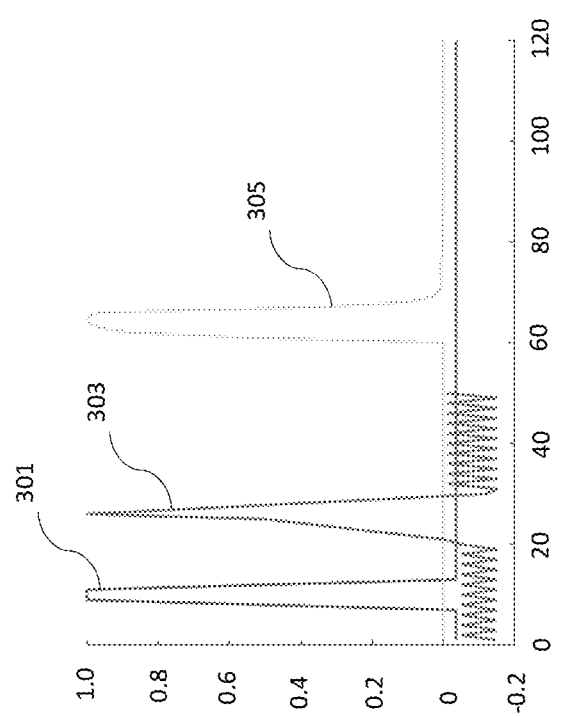
FIG. 12A illustrates three different filters for processing the histogram of a ToF imager, in an embodiment.

FIG. 12A illustrates three different filters for processing the histogram of a ToF imager, in an embodiment. Curve 301 shows a weighted filter, which is a square pulse with the sum of the filter coefficients being approximately zero. Curve 303 shows the differential correlator filter disclosed herein. Curve 305 shows a matched filter, which matches the pulse shape of the light source 103 in the ToF imager.

FIG. 12B illustrates the outputs of the different filters of FIG. 12A for comparison purpose, in an embodiment. In particular, curves 311, 313, and 315 are the output signals for the filters indicated by curves 301, 303, and 305, respectively. FIG. 12B further illustrates the histogram data 317 filtered by the filters. In addition, curve 319 in FIG. 12B shows the target locations, which are at the two peaks of the curve 319.

As illustrated in FIG. 12B, the curve 313 (e.g., output of the differential correlator filter) shows two pulse regions, defined by two pairs of start/stop points, that correspond to the target locations. In contrast, the curve 313 (e.g., output of the weighted filter) shows significant noise reduction, but with a single zero-crossing point, and the location of the single zero-crossing point has no connection (e.g., is unrelated) to the target location. The curve 315 (e.g., output of the matched filter) achieves noise smoothing, but has no zero-crossing point. In other words, the output signals from the weighted filter and the matched filter do not provide start/stop points to indicate the target location, and therefore, the outputs of the weighted filter and the matched filter need to be processed further by additional algorithms to extract the target information. In contrast, the output of the differential correlator filter directly provides start/stop points to indicate the target location(s), and a simple computation of the median phase provides an estimate of the target location. The highly efficient target information extraction provided by the differential correlator filter allows for easy integration of the differential correlator filter into the ToF imager, as discussed below with reference to FIGS. 13 and 14.

Figure 13:
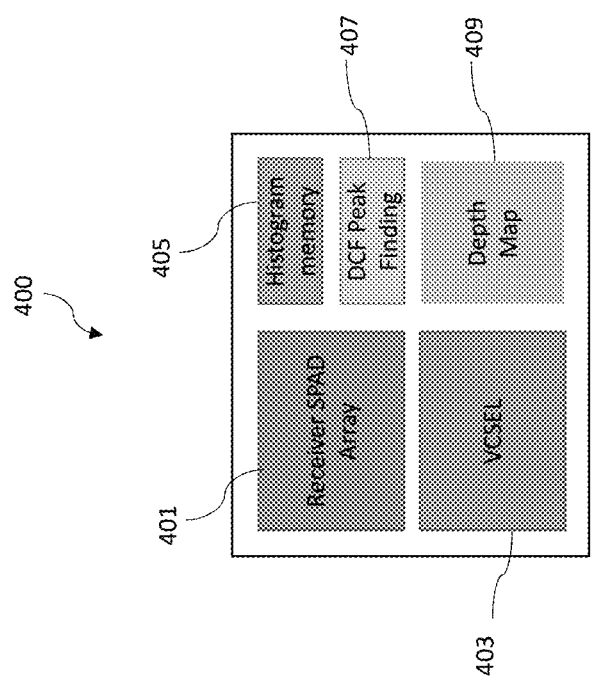
FIG. 13 illustrates an integrated circuit (IC) device formed as a ToF imager, in an embodiment.

FIG. 13 illustrates an integrated circuit (IC) device 400 formed as a ToF imager, in an embodiment. Note that for simplicity, not all features of the IC device 400 are illustrated. The IC device 400 includes a light source 403 (e.g., a VCSEL, an LED, or the like) and a SPAD array 401. The IC device 400 further includes a memory module 405 for storing the histogram data from the SPAD array 401. Notably in FIG. 13, a DCF peak finding circuit 407 is integrated in the IC device 400, which includes the differential correlator filter disclosed herein, and may include additional circuits for implementing the zero-crossing algorithm (e.g., for finding start/stop points of pulse regions) and for computing the median phase. The output of the DCF peak finding circuit 407 may be used to generate a depth map stored in a depth map memory 409. Note that the DCF peaking finding circuit 407 performs on-chip processing of the histogram data from the SPAD array 401, which significantly reduces the chip complexity related to I/O transfer of histogram data to an off-chip processing module, and reduces the processing delay related to off-chip processing. The IC device 400 may produce a depth map directly as an output, instead of relying on an off-chip processing module to produce the depth map.

Figure 14:
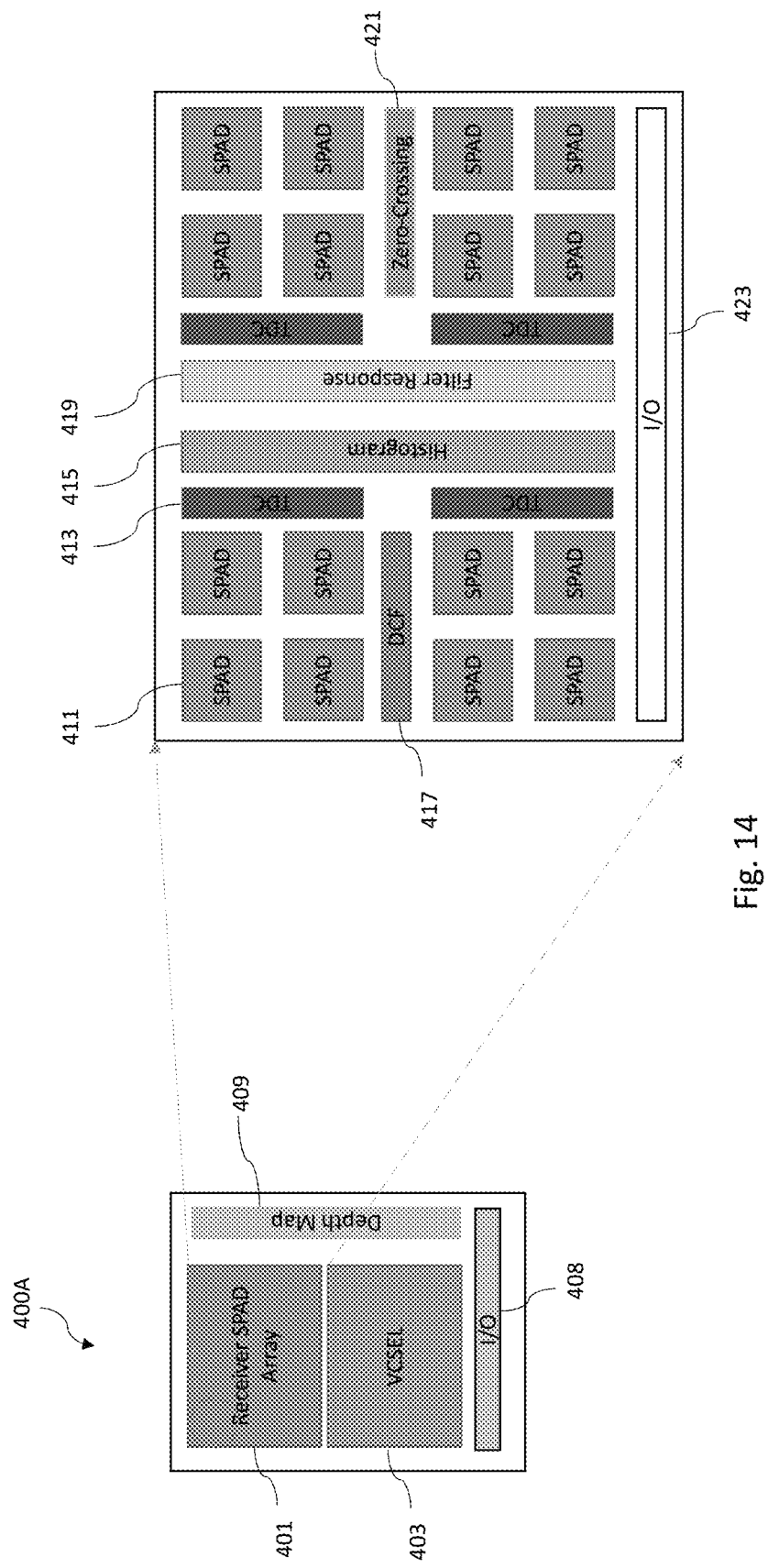
FIG. 14 illustrates an integrated circuit (IC) device formed as a ToF imager, in another embodiment.

FIG. 14 illustrates an integrated circuit (IC) device 400A formed as a ToF imager, in another embodiment. Note that for simplicity, not all features of the IC device 400A are illustrated. The IC device 400A includes a SPAD array 401, a light source 403, and a depth map memory 409. An I/O circuit 408 may be formed in the IC device 400A for communication with another device.

Note that in FIG. 13, the DCF peak finding circuit 407 is disposed outside of the SPAD array 401, and processes the histograms from the SPAD array stored in the memory module 405. In contrast, in FIG. 14, the differential correlator filter is integrated at the pixel level, e.g., integrated with each SPAD in the SPAD array. In some embodiments, each SPAD in the SPAD array has a respective differential correlator filter (DCF) 417 for processing its histogram data. In some embodiments, a few neighboring SPADs in the SPAD array may share a DCF 417. The right-hand side portion of FIG. 14 shows a zoomed-in view of a portion of the SPAD array 401, which shows a plurality of SPADs 411 of the SPAD array 401, the TDCs 413, a histogram memory 415 for storing histogram data from the SPADs 411, a DCF 417, a filter response memory 419 for storing the output of the DCF 417, a zero-crossing circuit 421 (e.g., for implementing the zero-cross algorithm and computing the median phase), and an I/O circuit 423. Note that the numbers of the SPADs 411, the TDCs 413, the histogram memory 415, the DCF 417, the filter response memory 419, and the I/O circuit 423 illustrated in FIG. 14 are for illustration purpose only and are non-limiting, other numbers are also possible and are fully intended to be included within the scope of this disclosure.

In some embodiments, the IC structure illustrated in FIG. 14 allows each pixel (e.g., each SPAD) of the SPAD array 401 to output the extracted target information (e.g., number of target indicated by number of pairs of start/stop points, and target location indicated by the median phase) directly, instead of the raw histogram data. In addition, the IC structure illustrated in FIG. 14 is well suited for parallel processing of all the pixels in the SPAD array 401 simultaneously, thereby reducing processing delay and allowing for SPAD arrays with high resolution to be formed easily.

Disclosed embodiments may achieve advantages. For example, the output of the disclosed differential correlator filter can be used to produce pairs of start/stop points for finding pulse regions corresponding to target locations, and a simple median phase calculation can be performed to find the target location. Compared with conventional processing algorithms that uses multiple instances or multiple iterations to process histogram data, the disclosed differential correlator filter offers simple, efficient histogram processing, and allows for easy integration into ToF imager.

Example embodiments of the present invention are summarized here. Other embodiments can also be understood from the entirety of the specification and the claims filed herein.

Example 1

In an embodiment, a differential correlator filter includes: a pre-pulse region, wherein first filter coefficients in the pre-pulse region have negative values; and a pulse region comprising: a rising edge region adjacent to the pre-pulse region, wherein second filter coefficients in the rising edge region have positive values; an accumulation region adjacent to the rising edge region, wherein third filter coefficients of the accumulation region have positive values; and a falling edge region adjacent to the accumulation region, wherein fourth filter coefficients of the falling edge region have positive values, wherein the accumulation region is between the rising edge region and the falling edge region. The differential correlator filter further includes a post-pulse region adjacent to the pulse region, wherein the pulse region is between the pre-pulse region and the post-pulse region, wherein fifth filter coefficients of the post-pulse region have negative values.

Example 2

The differential correlator filter of Example 1, wherein the second filter coefficients in the rising edge region increase along a first direction from the pre-pulse region toward the post-pulse region, wherein the fourth filter coefficients in the falling edge region decrease along the first direction.

Example 3

The differential correlator filter of Example 2, wherein the third filter coefficients in the accumulation region increase along the first direction.

Example 4

The differential correlator filter of Example 3, wherein the rising edge region has a first positive gradient, wherein the accumulation region has a second positive gradient different from the first positive gradient.

Example 5

The differential correlator filter of Example 4, wherein the rising edge region, the accumulation region, and the falling edge region are linear regions.

Example 6

The differential correlator filter of Example 2, wherein the rising edge region has a positive gradient, wherein the accumulation region has a zero gradient.

Example 7

The differential correlator filter of Example 2, wherein a sum of the first coefficients, the second coefficients, the third coefficients, the fourth coefficients, and the fifth coefficients is equal to or less than zero.

Example 8

The differential correlator filter of Example 2, wherein the first coefficients oscillate between a first negative value and a second negative value, wherein the fifth coefficients oscillate between a third negative value and a fourth negative value.

Example 9

The differential correlator filter of Example 8, wherein a first average of the first negative value and the second negative value is larger than a second average of the third negative value and the fourth negative value.

Example 10

The differential correlator filter of Example 2, wherein the first coefficients have a first fixed negative value, and the second coefficients have a second fixed value.

Example 11

In an embodiment, an integrated circuit (IC) device includes: a light source configured to generate a light signal; a single-photon avalanche diode (SPAD) array comprising a plurality of SPADs, wherein the SPAD array is configured to generate a histogram for each of the plurality of SPADs in the SPAD array; and a differential correlator filter configured to process the histogram for at least one of the plurality of SPADs. The different correlator filter includes: a pre-pulse region, wherein first filter coefficients in the pre-pulse region have negative values; and a pulse region comprising: a rising edge region, wherein second filter coefficients in the rising edge region have positive values; an accumulation region, wherein third filter coefficients of the accumulation region have positive values; and a falling edge region, wherein fourth filter coefficients of the falling edge region have positive values, wherein the accumulation region is between the rising edge region and the falling edge region, wherein a width of the pulse region corresponds to a full width at half maximum (FWHM) of a pulse shape of the light source. The different correlator filter further includes a post-pulse region, wherein the pulse region is between the pre-pulse region and the post-pulse region, wherein fifth filter coefficients of the post-pulse region have negative values.

Example 12

The IC device of Example 11, wherein a magnitude of a first sum of the first coefficients and the fifth coefficients is equal to or larger than a second sum of the second coefficients, the third coefficients, and the fourth coefficients.

Example 13

The IC device of Example 12, wherein the rising edge region has a first positive gradient, and the falling edge region has a negative gradient.

Example 14

The IC device of Example 13, wherein the accumulation region has a second positive gradient different from the first positive gradient.

Example 15

The IC device of Example 13, wherein the accumulation region has a zero gradient.

Example 16

The IC device of Example 11, wherein the first coefficients alternate between a first negative value and a second negative value, and the second coefficients alternate between a third negative value and a fourth negative value, wherein a first average of the first negative value and the second negative value is different from a second average of the third negative value and the fourth negative value.

Example 17

In an embodiment, a time-of-flight (ToF) imager includes: a light source configured to generate a light signal for illuminating an object; a single-photon avalanche diode (SPAD) configured to generate a histogram for reflected light signal from the object; and a differential correlator filter configured to process the histogram, the different correlator filter comprising: a pre-pulse region, wherein first filter coefficients in the pre-pulse region have negative values; and a pulse region comprising: a rising edge region, wherein second filter coefficients in the rising edge region have increasing positive values; an accumulation region, wherein third filter coefficients of the accumulation region have increasing positive values or a constant positive value; and a falling edge region, wherein fourth filter coefficients of the falling edge region have decreasing positive values, wherein the accumulation region is between the rising edge region and the falling edge region, wherein a width of the pulse region corresponds to a full width at half maximum (FWHM) of a pulse shape of the light source. The different correlator filter further comprises a post-pulse region, wherein the pulse region is between the pre-pulse region and the post-pulse region, wherein fifth filter coefficients of the post-pulse region have negative values.

Example 18

The ToF imager of Example 17, wherein a sum of the first coefficients, the second coefficients, the third coefficients, the fourth coefficients, and the fifth coefficients is equal to or less than zero.

Example 19

The ToF imager of Example 17, wherein values of the first coefficients alternate between a first negative value and a second negative value, and values of the second coefficients alternate between a third negative value and a fourth negative value.

Example 20

The ToF imager of Example 19, wherein a first average value of the first negative value and the second negative value is different from a second average value of the third negative value and the fourth negative value.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A differential correlator filter comprising:
    a pre-pulse region, wherein first filter coefficients in the pre-pulse region have negative values;
    a pulse region comprising:
        a rising edge region adjacent to the pre-pulse region, wherein second filter coefficients in the rising edge region have positive values;
        an accumulation region adjacent to the rising edge region, wherein third filter coefficients of the accumulation region have positive values; and
        a falling edge region adjacent to the accumulation region, wherein fourth filter coefficients of the falling edge region have positive values, wherein the accumulation region is between the rising edge region and the falling edge region; and
    a post-pulse region adjacent to the pulse region, wherein the pulse region is between the pre-pulse region and the post-pulse region, wherein fifth filter coefficients of the post-pulse region have negative values.

2. The differential correlator filter of claim 1, wherein the second filter coefficients in the rising edge region increase along a first direction from the pre-pulse region toward the post-pulse region, wherein the fourth filter coefficients in the falling edge region decrease along the first direction.

3. The differential correlator filter of claim 2, wherein the third filter coefficients in the accumulation region increase along the first direction.

4. The differential correlator filter of claim 3, wherein the rising edge region has a first positive gradient, wherein the accumulation region has a second positive gradient different from the first positive gradient.

5. The differential correlator filter of claim 4, wherein the rising edge region, the accumulation region, and the falling edge region are linear regions.

6. The differential correlator filter of claim 2, wherein the rising edge region has a positive gradient, wherein the accumulation region has a zero gradient.

7. The differential correlator filter of claim 2, wherein a sum of the first filter coefficients, the second filter coefficients, the third filter coefficients, the fourth filter coefficients, and the fifth filter coefficients is equal to or less than zero.

8. The differential correlator filter of claim 2, wherein the first filter coefficients oscillate between a first negative value and a second negative value, wherein the fifth filter coefficients oscillate between a third negative value and a fourth negative value.

9. The differential correlator filter of claim 8, wherein a first average of the first negative value and the second negative value is larger than a second average of the third negative value and the fourth negative value.

10. The differential correlator filter of claim 2, wherein the first filter coefficients have a first fixed negative value, and the second filter coefficients have a second fixed value.

11. An integrated circuit (IC) device, the IC device comprising:
- a light source configured to generate a light signal;
- a single-photon avalanche diode (SPAD) array comprising a plurality of SPADs, wherein the SPAD array is configured to generate a histogram for each of the plurality of SPADs in the SPAD array; and
- a differential correlator filter configured to process the histogram for at least one of the plurality of SPADs, the different correlator filter comprising:
  - a pre-pulse region, wherein first filter coefficients in the pre-pulse region have negative values;
  - a pulse region comprising:
    - a rising edge region, wherein second filter coefficients in the rising edge region have positive values;
    - an accumulation region, wherein third filter coefficients of the accumulation region have positive values; and
    - a falling edge region, wherein fourth filter coefficients of the falling edge region have positive values, wherein the accumulation region is between the rising edge region and the falling edge region, wherein a width of the pulse region corresponds to a full width at half maximum (FWHM) of a pulse shape of the light source; and
  - a post-pulse region, wherein the pulse region is between the pre-pulse region and the post-pulse region, wherein fifth filter coefficients of the post-pulse region have negative values.

12. The IC device of claim 11, wherein a magnitude of a first sum of the first filter coefficients and the fifth filter coefficients is equal to or larger than a second sum of the second filter coefficients, the third filter coefficients, and the fourth filter coefficients.

13. The IC device of claim 12, wherein the rising edge region has a first positive gradient, and the falling edge region has a negative gradient.

14. The IC device of claim 13, wherein the accumulation region has a second positive gradient different from the first positive gradient.

15. The IC device of claim 13, wherein the accumulation region has a zero gradient.

16. The IC device of claim 11, wherein the first filter coefficients alternate between a first negative value and a second negative value, and the second filter coefficients alternate between a third negative value and a fourth negative value, wherein a first average of the first negative value and the second negative value is different from a second average of the third negative value and the fourth negative value.

17. A time-of-flight (ToF) imager comprising:
- a light source configured to generate a light signal for illuminating an object;
- a single-photon avalanche diode (SPAD) configured to generate a histogram for reflected light signal from the object; and
- a differential correlator filter configured to process the histogram, the different correlator filter comprising:
  - a pre-pulse region, wherein first filter coefficients in the pre-pulse region have negative values;
  - a pulse region comprising:
    - a rising edge region, wherein second filter coefficients in the rising edge region have increasing positive values;
    - an accumulation region, wherein third filter coefficients of the accumulation region have increasing positive values or a constant positive value; and
    - a falling edge region, wherein fourth filter coefficients of the falling edge region have decreasing positive values, wherein the accumulation region is between the rising edge region and the falling edge region, wherein a width of the pulse region corresponds to a full width at half maximum (FWHM) of a pulse shape of the light source; and
  - a post-pulse region, wherein the pulse region is between the pre-pulse region and the post-pulse region, wherein fifth filter coefficients of the post-pulse region have negative values.

18. The ToF imager of claim 17, wherein a sum of the first filter coefficients, the second filter coefficients, the third filter coefficients, the fourth filter coefficients, and the fifth filter coefficients is equal to or less than zero.

19. The ToF imager of claim 17, wherein values of the first filter coefficients alternate between a first negative value and a second negative value, and values of the second filter coefficients alternate between a third negative value and a fourth negative value.

20. The ToF imager of claim 19, wherein a first average value of the first negative value and the second negative value is different from a second average value of the third negative value and the fourth negative value.

* * * * *